US011196258B2

(12) United States Patent
Rechtiene et al.

(10) Patent No.: US 11,196,258 B2
(45) Date of Patent: Dec. 7, 2021

(54) ENERGY CONTROL AND STORAGE SYSTEM FOR CONTROLLING POWER BASED ON A LOAD SHAPE

(71) Applicant: Sacramento Municipal Utility District, Sacramento, CA (US)

(72) Inventors: Nikolas Rechtiene, Sacramento, CA (US); James Frasher, El Dorado Hills, CA (US); Obadiah Bartholomy, Sacramento, CA (US)

(73) Assignee: Sacramento Municipal Utility District, Sacramento, CA (US)

( * ) Notice: Subject to any disclaimer, the term of this patent is extended or adjusted under 35 U.S.C. 154(b) by 0 days.

(21) Appl. No.: 16/054,982

(22) Filed: Aug. 3, 2018

(65) Prior Publication Data

US 2020/0044447 A1 Feb. 6, 2020

(51) Int. Cl.
*H02J 3/14* (2006.01)
*G06Q 50/06* (2012.01)
(Continued)

(52) U.S. Cl.
CPC .............. *H02J 3/14* (2013.01); *G06Q 50/06* (2013.01); *H02J 3/005* (2013.01); *H02J 3/32* (2013.01);
(Continued)

(58) Field of Classification Search
CPC .... H02J 3/14; H02J 3/005; H02J 3/386; H02J 3/32; H02J 3/383; H02J 2003/003; H02J 2003/143; G06Q 50/06
See application file for complete search history.

(56) References Cited

U.S. PATENT DOCUMENTS 5,929,538 A * 7/1999 O'Sullivan ........... H02J 7/1415
307/44
8,295,990 B2 10/2012 Venkatakrishnan et al.
(Continued)

FOREIGN PATENT DOCUMENTS

CN 103595348 2/2014
CN 205657486 10/2016
(Continued)

OTHER PUBLICATIONS

Richard Perez et al., "Achieving very high PV penetration—The need for an effective electricity remuneration framework and a central role for grid operators," Energy Policy, ScienceDirect, vol. 96, Sep. 2016, pp. 27-35.
(Continued)

*Primary Examiner* — Christopher E. Everett
(74) *Attorney, Agent, or Firm* — InventIQ Legal LLP; Steven J. Cahill (57) ABSTRACT

An energy control and storage system includes an energy monitor, a power controller, an energy storage device, and a computing unit. The energy monitor monitors power provided between an electric distribution system and a load. The power controller exchanges power with the energy monitor and receives power from a power generation system. The energy storage device stores energy received through the power controller. The computing unit receives a load shape from outside the energy control and storage system. The computing unit controls power exchanged between the energy control and storage system and the electric distribution system based on power indicated by the load shape that changes in response to varying conditions affecting the electric distribution system.

22 Claims, 5 Drawing Sheets

(51) Int. Cl.
  *H02J 3/38*   (2006.01)
  *H02J 3/32*   (2006.01)
  *H02J 3/00*   (2006.01)

(52) U.S. Cl.
  CPC .............. *H02J 3/383* (2013.01); *H02J 3/386* (2013.01); *H02J 3/003* (2020.01); *H02J 2310/14* (2020.01)

(56) References Cited

U.S. PATENT DOCUMENTS

| | | | |
|---|---|---|---|
| 9,203,239 B2 | 12/2015 | Parsonnet | |
| 10,128,659 B2 | 11/2018 | Rive et al. | |
| 2003/0047209 A1 | 3/2003 | Yanai et al. | |
| 2004/0036360 A1* | 2/2004 | McCombs | H02J 3/32 307/46 |
| 2006/0276938 A1* | 12/2006 | Miller | G06Q 50/06 700/295 |
| 2008/0052145 A1* | 2/2008 | Kaplan | H02J 3/322 705/7.12 |
| 2009/0319090 A1* | 12/2009 | Dillon | G06Q 10/04 700/291 |
| 2010/0008119 A1 | 1/2010 | O'Brien et al. | |
| 2010/0174418 A1 | 7/2010 | Haugh | |
| 2010/0198421 A1* | 8/2010 | Fahimi | H02J 3/32 700/291 |
| 2010/0306027 A1* | 12/2010 | Haugh | G06Q 10/04 705/7.36 |
| 2010/0318234 A1* | 12/2010 | Moore | H02J 7/0013 700/293 |
| 2011/0015799 A1* | 1/2011 | Pollack | G06Q 30/0208 700/291 |
| 2011/0035070 A1* | 2/2011 | Kanai | H02J 3/14 700/288 |
| 2011/0125337 A1* | 5/2011 | Zavadsky | G06F 1/263 700/291 |
| 2011/0172837 A1 | 7/2011 | Forbes, Jr. | |
| 2011/0231028 A1* | 9/2011 | Ozog | G06Q 10/06 700/291 |
| 2012/0245751 A1 | 9/2012 | Gow et al. | |
| 2012/0319642 A1* | 12/2012 | Suyama | H02J 3/32 320/101 |
| 2013/0006431 A1* | 1/2013 | Palomo | G06Q 50/06 700/287 |
| 2013/0229057 A1* | 9/2013 | Taima | H02J 3/32 307/19 |
| 2013/0268463 A1* | 10/2013 | Arya | G06Q 10/04 705/400 |
| 2014/0039710 A1* | 2/2014 | Carter | G06Q 10/06 700/291 |
| 2014/0067140 A1* | 3/2014 | Gow | G06Q 50/06 700/291 |
| 2014/0094979 A1 | 4/2014 | Mansfield | |
| 2014/0200723 A1* | 7/2014 | Roy | G06Q 50/06 700/291 |
| 2014/0350743 A1* | 11/2014 | Asghari | G05B 13/048 700/297 |
| 2015/0112751 A1* | 4/2015 | Spooren | H02J 3/14 705/7.25 |
| 2015/0324696 A1 | 11/2015 | Hirschbold et al. | |
| 2016/0013652 A1 | 1/2016 | Li et al. | |
| 2016/0036226 A1* | 2/2016 | Gan | H02J 3/00 700/286 |
| 2016/0241042 A1* | 8/2016 | Mammoli | H02S 40/38 |
| 2016/0377306 A1* | 12/2016 | Drees | G05B 15/02 700/295 |
| 2017/0005474 A1 | 1/2017 | Sanders et al. | |
| 2017/0005515 A1 | 1/2017 | Sanders et al. | |
| 2017/0317528 A1* | 11/2017 | Fife | H02J 3/00 |
| 2018/0090943 A1* | 3/2018 | Wu | G05F 1/66 |

FOREIGN PATENT DOCUMENTS

| | | |
|---|---|---|
| KR | 10-2016-0128781 A | 11/2016 |
| KR | 10-2017-0078213 A | 7/2017 |

OTHER PUBLICATIONS

William Tokash et al., "Navigant Research Leaderboard Report: Distributed-Scale Energy Storage Systems Integrators Assessment of Strategy and Execution for 14 Distributed-Scale ESS Integrators," Published 2Q 2017, pp. 1-53.

Korean Intellectual Property Office, "International Search Report," for International application No. PCT/US2019/044540, dated Nov. 19, 2019, p. 1-3.

Korean Intellectual Property Office, "Written Opinion of the International Searching Authority," for International application No. PCT/US2019/044540, dated Nov. 19, 2019, p. 1-7.

\* cited by examiner

ENERGY CONTROL AND STORAGE SYSTEM FOR CONTROLLING POWER BASED ON A LOAD SHAPE

FIELD OF THE DISCLOSURE

The present disclosure relates to an energy control and storage system, and more particularly, to an energy control and storage system that controls power exchanged with an electric distribution system based on a load shape.

BACKGROUND

Because of higher energy usage by consumers during certain hours of the day and at certain times of the year, electric utilities often have to buy more power at higher prices to supply consumers during times of peak power demand. Consequently, utilities often charge higher rates during times of peak power demand with the intention of incentivizing consumers to lower power usage during these times. Utilities have imposed variable rates or other incentives, such as time of use (TOU), TOU critical peak pricing (CPP), demand response (DR), and net metering, to illicit conservation of power during times of peak power demand.

DETAILED DESCRIPTION

Electricity usage in many electric utility service areas has increased substantially. In some areas, homes and businesses that previously used gas appliances are switching to electric appliances. The mass conversion of gas appliances to electric appliances is likely to cause an increase in the on-peak load on a utility's electric grid, especially in residential areas having high densities of homes that converted from gas appliances. The increased load may encourage some customers to increase the size of, or install for the first time, solar photovoltaic (PV) arrays to mitigate the increased electricity cost. A likely result of broad electrification of homes is increased PV back feeding to the electric grid during mid-day hours and increased peak demand on the electric grid in the evening hours after solar PV arrays have ceased generating power. An electric grid is also referred to herein as an electric distribution system. An electric utility is also referred to herein simply as a utility.

Homeowners, especially in older homes, may need to upgrade their main electric panels to support electrical service for the additional electric appliances. A significant number of electric panel upgrades in a community may require a utility infrastructure upgrade. The upgrade may include upgrading service drops, service transformers, re-conductoring feeders, upgrading circuit switches, and installing additional capacity at the circuit level.

As discussed above, electric utilities often use variable rates or other incentives, such as TOU, TOU CPP, DR, and net metering, to reduce power consumption during times of peak power demand. However, these incentives are often imperfect and unpredictable. TOU rates and other similar rate structures do not allow for nuanced load shaping that addresses locational or time-sensitive factors. Demand response and similar options are irregular and unpredictable both in when they are used and how customers respond to demand response requests. In addition, customers generally prefer simplicity and predictability in energy pricing, which are not addressed by these variable rate structures.

Home Energy Management Systems (HEMS) have been used to adjust energy usage within the home to reduce the overall cost of electricity. However, HEMS may not be implemented in every home in a local area. Also, there are many different HEMS in existence, and their effectiveness may vary considerably. For these reasons, HEMS do not provide optimal customer electricity usage relative to the variable power supplied to and drawn from an electric distribution system. HEMS do not modify the load at a customer site to match a utility desired load shape that is beneficial to the needs of an electric distribution system.

According to some embodiments disclosed herein, an energy control and storage system at a utility customer site receives a load shape (e.g., from an electric utility) that changes in response to varying conditions affecting an electric distribution system. The energy control and storage system can include an energy storage device (e.g., a battery), an energy monitor, and a computing unit. The energy control and storage system operates in conjunction with an on-site power generation system, such as a rooftop solar photovoltaic (PV) system, to provide on-site power generation and energy storage along with reliability and islanding capabilities. Power exchanged between the electric distribution system (i.e., an electric grid) and the energy control and storage system is monitored by the energy monitor and controlled using software running on the computing unit. The computing unit controls the power exchanged between the energy control and storage system and the electric distribution system based on the power indicated by the load shape. The computing unit may, for example, modulate the load at the customer site into a load shape requested by the utility.

In some embodiments, the energy control and storage systems at multiple customer sites may be available as an aggregated market asset to provide locational energy services, such as demand response, smart grid automation systems, and outage mitigation. As an example, energy storage at one or more customer sites may be provided through the electric distribution system to other customer sites. Excess energy production is stored in the on-site energy storage device, obviating the need for net metering or sub-metering.

The energy control and storage system can enable a customer site to maintain electric loads that are in excess of the electric current rating of the main electric panel at the customer site using the energy storage device and the on-site power generation system. The energy control and storage system may allow for de-carbonization of other non-electric loads at a customer site without the necessity of electric panel and/or electric service upgrades.

In some embodiments, customers can receive flat bills from an electric utility for a long period of time that reflect the cost of the deployed assets of the energy control and storage systems, along with an estimated utilization of energy. The flat bills provide customers with cost certainty, because the flat bills do not vary based on the customers' variable usage of electricity. The flat bills may also include any sharing of mutual value streams, such as intermittent cost avoidance. The modular nature of the deployed assets allows for structural changes in energy usage at a customer site to be addressed through the addition of solar panels or battery modules, which can be reflected in changes to the flat bill. In addition, the utility may split dividends with the customer over time if energy consumption patterns and/or participation favor the utility. This arrangement strongly incentivizes the utility to encourage the customer to make additional energy saving investments at the customer site in order to increase the difference between the cost of energy consumed at the customer site and the flat bill payment.

The energy control and storage system (ECSS) can also assist with load forecasting and day ahead procurement of power at lower costs. A load forecast is a forecast of power supply to and power demand from an electric distribution system (EDS), or a portion thereof. A load forecast may be generated by a utility. The power exchanged between the ECSS and the EDS can be controlled based on the load shape in order to cause the power exchanged between the ECSS and the EDS to match a load forecast. In addition, the power exchanged between multiple ECSSs and the EDS can be controlled using load shapes provided to the ECSSs to cause the power exchanged between the ECSSs and the EDS to match a load forecast for a local portion of the EDS or for the entire EDS. The ECSS can also be used to reduce the utility's costs for procuring electric power by modifying the ECSS's load on the EDS in response to the load shape. For example, the ECSS can make an economic decision whether to buy electricity from the EDS or to use energy generated or stored on-site based on electricity prices as indicated by the load shape. A load model generated by a utility can optimize this economic decision from the customer site all the way up to larger upstream systems and assets and the broader energy markets for economic dispatch that also allows other, under-utilized power generation and storage assets to be recruited to participate in energy markets more dynamically.

The ECSS can actively manage the amount of power exchanged with the EDS in response to the load shape to reduce the variability in the amount of electric power delivered by the EDS to a customer site. As a result, the high variability of power consumption risk at a customer site is mitigated. The reduction in the variation of power drawn from the EDS, along with the ability to size the ECSS in a modular way (e.g., by changing the capacity of the solar photovoltaic panels and/or batteries) to meet predicted loads, reduces the risk to the utility of charging a utility customer a flat bill (e.g., a periodic fixed fee) that reflects an amortization of the investment costs of the ECSS and a risk adjusted fixed fee for the smaller power consumption variable. Matching the power drawn by the ECSS to a load forecast as discussed above also reduces the risk to the utility of charging utility customers flat bills. The load shape and the cost of the flat bill can be generated in part based on the historical electricity usage patterns at the customer site. Unforeseen power demand at the customer site can, for example, be supplied at least in part from the energy storage device and/or on-site power generation. As another example, the ECSS can also respond to a load shape from the utility that indicates a change to a previous load forecast. If a load forecast turns out to be inaccurate (e.g., due to changing electricity prices or a power outage), the utility can provide an updated load shape to the ECSS that indicates to modify power exchanged with the EDS based on an updated load forecast. The ECSS can further reduce power consumption costs by responding dynamically to updated load forecasts.

Figure 1:
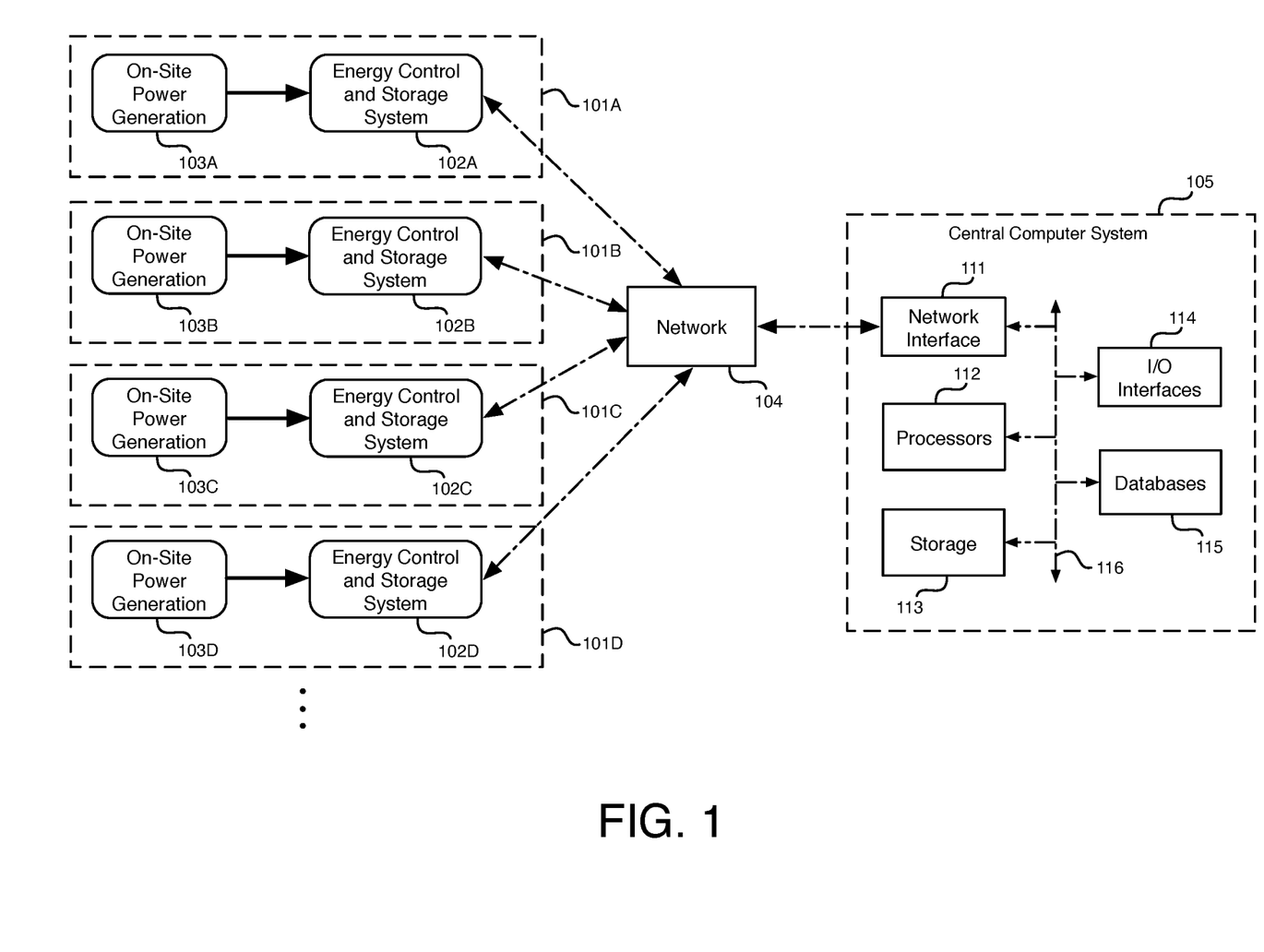
FIG. 1 is a diagram illustrating an exemplary system for transmitting data relating to electric power between a central computer system and utility customer sites, according to an embodiment.

FIG. 1 is a diagram illustrating an exemplary system for transmitting data relating to electric power between a central computer system and utility customer sites, according to an embodiment. In the embodiment of Figure (FIG. 1, utility customer sites 101A, 101B, 101C, and 101D (collectively referred to herein as utility customer sites 101 or customer sites 101) include energy control and storage systems 102A, 102B, 102C, and 102D (collectively referred to herein as energy control and storage systems 102), respectively. Utility customer sites 101A, 101B, 101C, and 101D also include on-site power generation systems 103A, 103B, 103C, and 103D (collectively referred to herein as on-site power generation systems 103), respectively. Utility customer sites 101 may be, for example, residential, businesses, or a combination thereof.

Each of the energy control and storage systems (ECSSs) 102 are connected through a network 104 to a central computer system 105. The data communication channels are shown in FIGS. 1-4 by lines having alternating long and short dashes. Each of the customer sites 101 is connected to receive electric power from an electric distribution system managed by an electric utility. The electric distribution system is not shown in FIG. 1. Each of ECSSs 102 receives electric power from a respective one of the on-site power generation systems 103. The distribution lines and wires that transmit electric power (e.g., from systems 103 to systems 102) are shown in FIGS. 1-4 by bold lines. Four utility customer sites 101 are shown in FIG. 1 as an example. Although it should be understood that an electric distribution system may be connected to provide electric power to hundreds, thousands, or even millions of customer sites.

Each of the energy control and storage systems (ECSSs) 102 serves as an electric load at the respective customer site 101. Each of the ECSSs 102 can periodically send data indicating electricity consumption at the respective customer site 101 through network 104 to computer system 105 for generating a load shape. Each of the ECSSs 102 can also periodically send data indicating the energy supply from the respective on-site generation system 103 and energy stored at the respective customer site 101 through network 104 to computer system 105 for generating a load shape. Communications of data between the ECSSs 102 and the computer system 105 may be through wireless connections, wires, power lines, or any combination thereof in network 104. Computer system 105 may, for example, be located at a facility that is operated by the electric utility.

FIG. 1 illustrates some exemplary components of computer system 105. In the example of FIG. 1, computer system 105 includes a network interface 111, one or more processor devices 112, one or more storage devices 113, one or more input/output (I/O) interfaces 114, and one or more databases 115. Each of the components 111-115 of computer system 105 are connected through a communication system 116 (e.g., one or more busses and/or network connections). In other embodiments, computer system 105 may include additional devices that are not shown in FIG. 1 and/or may not have one or more of the devices shown in FIG. 1.

Network interface 111 receives data from and provides data to customer sites 101 through network 104. Processors 112 may include any number of processor and/or controller circuits/devices, such as, for example, a CPU (central processing unit), microprocessor, graphics processing unit (GPU), field programmable gate array, etc. Storage 113 may include volatile and/or non-volatile memory devices such as solid state memory devices, disc storage devices, magnetic tape, etc. The input/output (I/O) interfaces 114 may include, for example, devices for inputting data to the computer system 105 (e.g., a mouse and a keyboard), and mechanisms for providing results from the computer system 105 (e.g., printers and computer monitors). Databases 115 may, for example, include one or more storage devices, additional processors, and associated database software. The storage devices may be organized into any suitable configuration, for example, a storage area network.

The data provided from energy control and storage systems 102 through network 104 may be stored in storage devices 113 and/or in databases 115 in computer system 105. Software run on processors 112 may access this data for analysis as disclosed in further detail below. One or more users may interface with the software using the one or more I/O interfaces 114.

Figure 2:
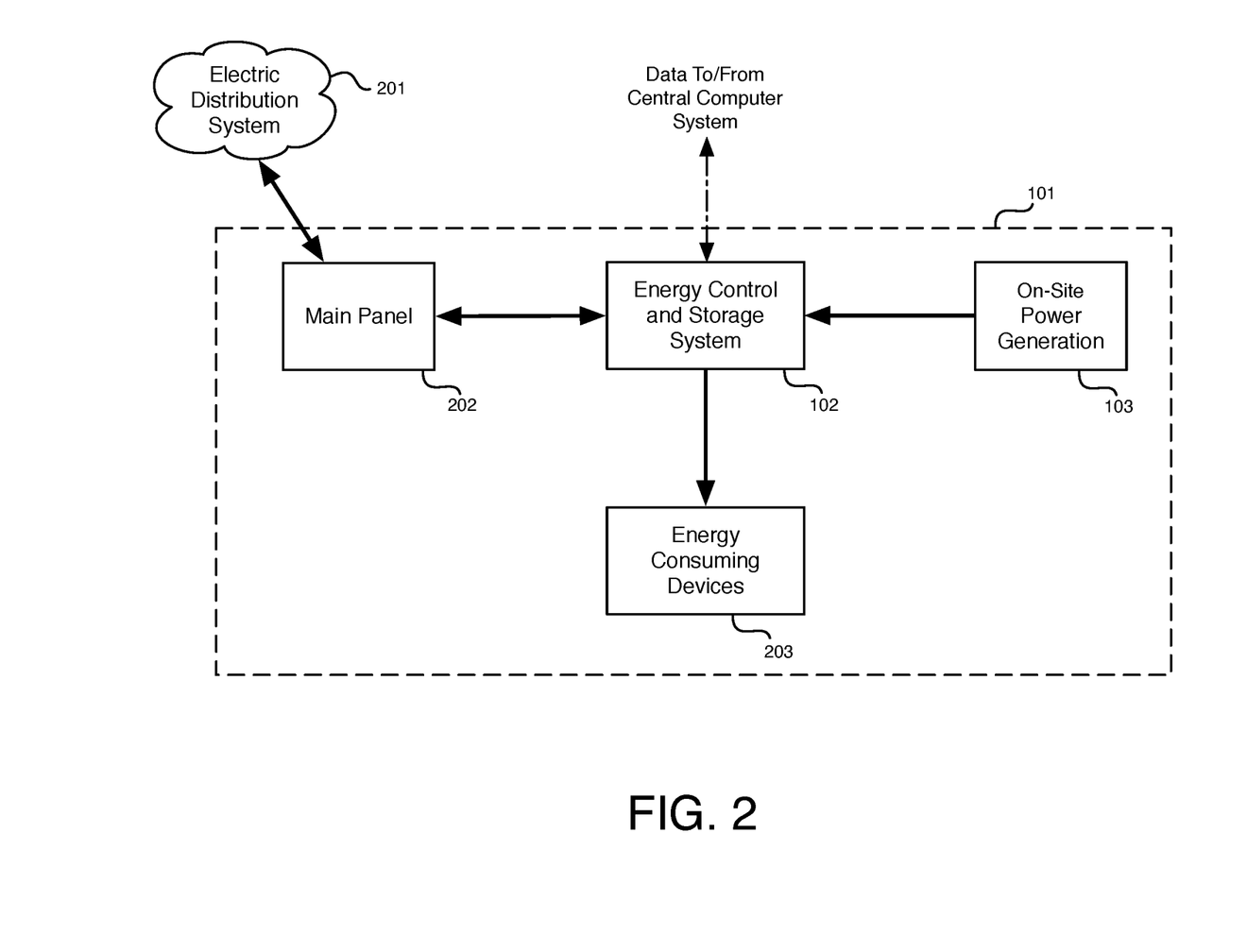
FIG. 2 is a diagram illustrating a system that exchanges electric power with a utility customer site, according to an embodiment.

FIG. 2 is a diagram illustrating a system that exchanges electric power with a utility customer site, according to an embodiment. FIG. 2 illustrates an electric distribution system (EDS) 201 (i.e., an electric grid) that is managed by an electric utility. FIG. 2 also illustrates components that generate and distribute power at a customer site 101. In the example of FIG. 2, the customer site 101 includes a main panel 202, an energy control and storage system (ECSS) 102, an on-site power generation system (OSPGS) 103, and energy consuming devices 203. ECSS 102 and on-site power generation system 103 of FIG. 2 are examples of the energy control and storage systems 102A-102D and on-site power generation systems 103A-103D, respectively, shown in FIG. 1.

The electric distribution system (EDS) 201 is connected to the main panel 202 through one or more power lines. EDS 201 receives electric power from off-site power sources (not shown). Main panel 202 includes at least one main circuit breaker that allows or interrupts the flow of electric current between EDS 201 and site 101. Main panel 202 is connected to ECSS 102 through one or more wires. When the main circuit breaker in main panel 202 is closed, electric power can be provided through main panel 202 between ECSS 102 and EDS 201.

On-site power generation system (OSPGS) 103 generates electric power at the customer site 101. OSPGS 103 provides the electric power that it generates to ECSS 102 through one or more wires. OSPGS 103 may, for example, include one or more solar photovoltaic (PV) panels, one or more wind power generation devices, and/or a gas generator. The amount of on-site power generation installed at customer site 101 may be selected based on the expected power supply to and demand from EDS 201, rather than to achieve energy independence for customer site 101.

Thus, ECSS 102 can receive electric power from on-site generation system 103 and from EDS 201 via main panel 202. ECSS 102 includes an energy storage device (e.g., a battery) that can store energy received from the EDS 201 and from the on-site generation system 103. Providing ECSS 102 with an energy storage device adds flexibility to ECSS 102 and to EDS 201. ECSS 102 provides electric power to one or more energy consuming devices 203 at the customer site 101. Devices 203 function as a load on ECSS 102. The energy consuming devices 203 may include, for example, lighting, home appliances, electric vehicles, computers, electric tools, rechargeable consumer devices, and any other devices that use electricity. ECSS 102 communicates with central computer system 105, as disclosed herein with respect to FIG. 1.

The configuration of FIG. 2 enables ECSS 102 to provide electric current to energy consuming devices 203 that is greater than the maximum rated current load of main panel 202. As an example, if main panel 202 has a maximum rating of 75 amperes (amps), then ECSS 102 can provide more than 75 amps to devices 203 using additional current from the energy storage device (e.g., a battery) and/or on-site generation system 103. ECSS 102 can allow for the de-carbonization of other non-electric energy consuming devices at customer site 101 (e.g., converting from gas appliances to electric appliances) without needing to upgrade main panel 202 and possibly other electric devices and wires that provide power to site 101.

In some embodiments, each utility customer having an ECSS 102 can receive a reoccurring flat utility bill (e.g., a monthly fixed fee) for a long period of time (e.g., over 15-25 years). The flat utility bill can reflect the cost of the deployed assets of ECSS 102 and on-site power generation system 103, along with their estimated utilization and potentially any sharing of mutual value streams, such as intermittent cost avoidance. ECSS 102 is modular in that more on-site power generation (e.g., more solar panels) or more energy storage devices (e.g., more batteries) can be added at the customer site. As a result, structural changes in power usage can be addressed through the addition of more on-site power generation systems 103 or more energy storage at the customer site. The cost of adding more power generation or power storage at the customer site can be offset by an increase in the flat utility bill.

In some embodiments, the owner of ECSS 102 and on-site generation system 103 can be the utility or a third party provider. The owner of systems 102-103 can, for example, split the dividends of on-site power generation and storage with the occupant or owner of the customer site 101 over time if energy consumption patterns and/or participation favor the utility. For this reason, the utility is strongly incentivized to encourage additional energy saving investments at the customer site (e.g., high efficiency heating and air conditioning, variable speed pool pumps, etc.) to increase the difference between the cost of energy consumed at the customer site and the flat utility bill payment.

Figure 3:
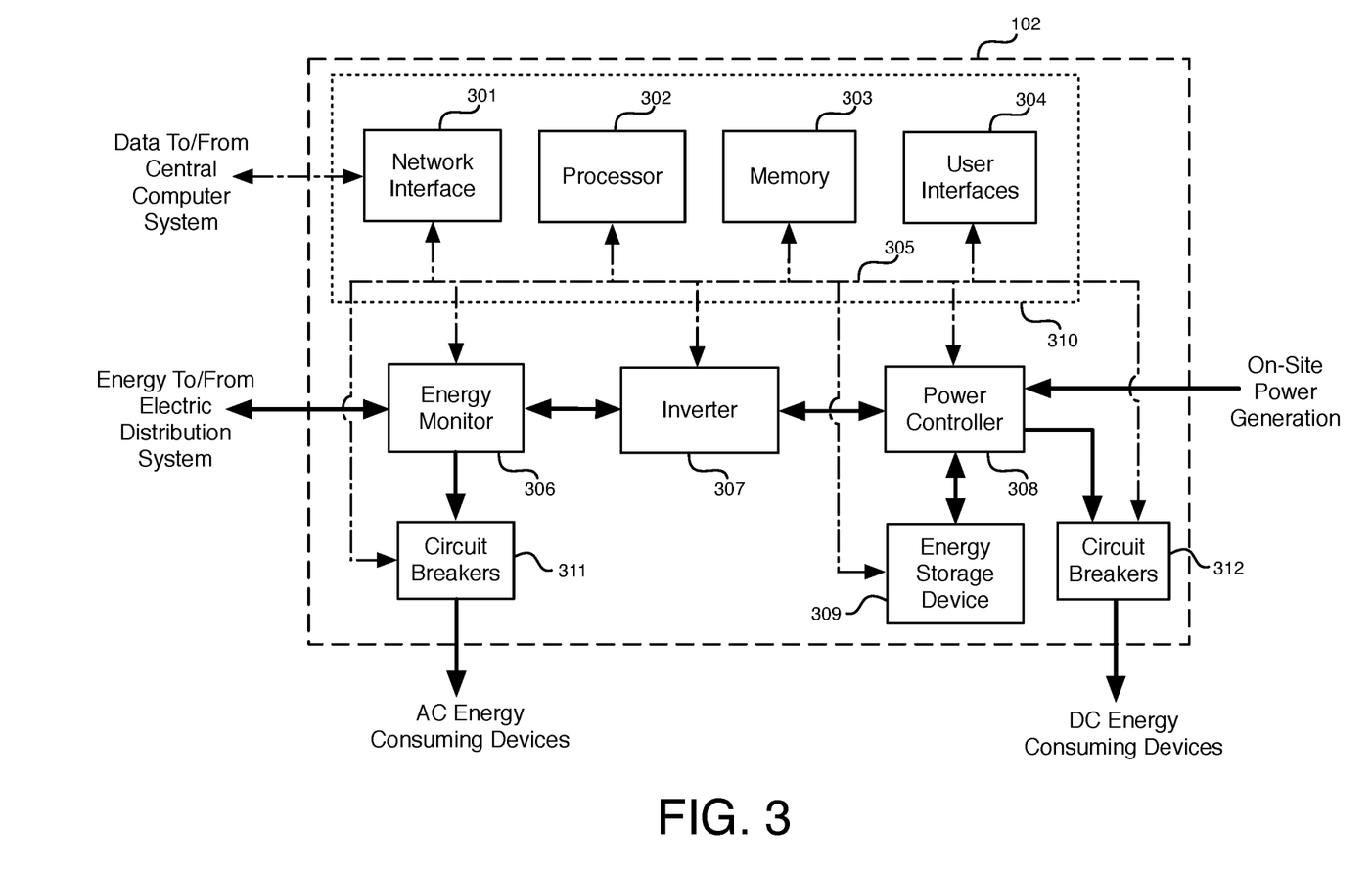
FIG. 3 is a diagram that illustrates further details of the energy control and storage system shown in FIG. 2, according to an embodiment.

FIG. 3 is a diagram that illustrates further details of the energy control and storage system 102 shown in FIG. 2, according to an embodiment. In the example of FIG. 3, energy control and storage system (ECSS) 102 includes an energy monitor 306, a bidirectional inverter circuit 307, a power controller 308, an energy storage device 309, a computing unit (CU) 310, and circuit breakers (CBs) 311-312. Each of the components 306-312 of ECSS 102 may, for example, be housed in a single physical unit or device. Computing unit 310 includes a network interface 301, a processor circuit 302, memory 303, one or more user interfaces 304, and connections 305 (e.g., a system bus). The computing unit 310 is coupled to and controls each of energy monitor 306, inverter circuit 307, power controller 308, energy storage device 309, and circuit breakers 311-312 through connections 305.

On-site power generation system (OSPGS) 103 provides electric power to power controller 308 as direct circuit (DC). Power controller 308 may include one or more DC/DC converter circuits, power interfaces, AC/DC converter circuits, controller circuits, memory circuitry, and other electrical components. Computing unit (CU) 310 can cause power controller 308 to store a portion of or all of the electric power received from OSPGS 103 in energy storage device 309, for example, when device 309 is not full and OSPGS 103 is generating excess power. If OSPGS 103 includes rooftop solar PV panels, OSPGS 103 may, for example, generate excess power during the mid-day hours of the spring and summer months.

Power controller 308 can include one or more electric meters/monitors that monitor the power output of OSPGS 103 and the power stored in and retrieved from storage device 309. Electric power can, for example, be provided between power controller 308 and energy storage device 309 as direct current (DC). Energy storage device 309 may include, for example, an electrical storage device (e.g., one or more batteries, one or more capacitors, one or more super capacitors, etc.), a mechanical storage device, a heat storage device, or another type of energy storage technology.

In the embodiment of FIG. 3, energy consuming devices 203 include devices that consume AC power (shown as AC energy consuming devices in FIG. 3) and devices that consume DC power (shown as DC energy consuming devices in FIG. 3). Power controller 308 provides DC electric power to the DC energy consuming devices 203 through circuit breakers 312 as shown in FIG. 3. Power controller 308 directs the flow of power from one or more of EDS 201, OSPGS 103, or energy storage device 309 to the DC energy consuming devices 203 in response to input from CU 310. Power controller 308 can, for example, provide power to the DC energy consuming devices without routing through main panel 202, which allows ECSS 102 to serve loads in excess of the power rating of main panel 202 without requiring a distribution system upgrade. Power controller 308 includes an electric meter/monitor that monitors and records the flow of electricity to the DC energy consuming devices 203. CU 310 opens or closes circuit breakers 312 to turn the flow of power to the DC energy consuming devices off or on.

Power controller 308 can also provide electric power from energy storage device 309 and/or from OSPGS 103 to the AC energy consuming devices 203 through inverter 307, energy monitor 306, and circuit breakers (CBs) 311. Inverter 307 is a bidirectional inverter that converts direct current (DC) to alternating current (AC) or AC to DC. Inverter 307 converts DC electric power received from power controller 308 to AC electric power that is provided through energy monitor 306 and CBs 311 to the AC energy consuming devices 203.

ECSS 102 can provide electric power from one or more of electric distribution system (EDS) 201, OSPGS 103, or energy storage device 309 to energy consuming devices 203. Energy monitor 306 includes a power controller that directs the flow of power from EDS 201 or from inverter 307 to the AC energy consuming devices 203 in response to input from computing unit (CU) 310. Energy monitor 306 includes one or more electric meters. Energy monitor 306 monitors and records the flow of electricity to and from EDS 201. Energy monitor 306 also monitors and records the flow of electricity to the AC energy consuming devices 203.

The electric power flow from EDS 201, from OSPGS 103, and from energy storage device 309 to the AC and DC energy consuming devices 203 can be turned off by opening CBs 311-312, for example, in response to the customer not paying a utility bill as indicated by data received from computer system 105 at CU 310. Energy monitor 306, inverter 307, and power controller 308 can continue to provide power from OSPGS 103 and from energy storage device 309 to EDS 201 when power to the AC and DC energy consuming devices 203 is turned off via CBs 311-312. Because energy monitor 306 and power controller 308 perform the functions of a utility meter, customer site 101 does not need a separate utility meter for monitoring electric power.

Energy monitor 306 provides data to CU 310 that indicates the amount of electric power exchanged between EDS 201 and energy monitor 306 over time and the amount of electric power drawn by the AC energy consuming devices 203 over time. Power controller 308 provides data to CU 310 that indicates the amount of power generated by OSPGS 103 over time. Power controller 308 and/or energy storage device 309 provides data to CU 310 that indicates the amount of energy stored in energy storage device 309 over time. Power controller 308 also provides data to CU 310 that indicates the amount of electric power drawn by the DC energy consuming devices 203 over time. CU 310 can provide data to central computer system 105 that indicates the amount of electric power exchanged between EDS 201 and ECSS 102 over time, the amount of electric power drawn by the energy consuming devices 203 from ECSS 102 over time, the amount of power generated by OSPGS 103 over time, the amount of energy stored in energy storage device 309 over time, and other information relating to the operation of ECSS 102. Central computer system 105 can use this data received from CU 310 (referred to below as internal variables) to generate a load shape for ECSS 102 and/or load shapes for some or all of the ECSSs 102 in a local area or throughout the EDS 201. CU 310 may display data regarding electricity usage by devices 203 to a user via user interfaces 304.

Each of the CBs 311-312 is connected to a different electric circuit at customer site 101. Each electric circuit is connected to a different subset of the energy consuming devices 203. CU 310 opens or closes the individual CBs 311-312 to control which of the energy consuming devices 203 receive power from ECSS 102 at any given time. The wires that connect CBs 311-312 to energy consuming devices 203 may be routed through main panel 202 or separately from main panel 202.

In addition, ECSS 102 can communicate with and control other power assets at customer site 101, such as smart thermostats and circuits inside the customer's premise. ECSS 102 can have visibility into and control of these power assets to perform many functions, such as verification and monitoring of electric vehicle servicing equipment (EVSE), verification and reporting of low carbon fuel standards (LCFS) credits, etc. The ECSS 102 can directly control these power assets based on a load shape received from the utility, for example, by adjusting the temperature setting of a smart thermostat at different times of the day to achieve power savings. As another example, ECSS 102 can control the charging and discharging of batteries in one or more electric vehicles (e.g., electric automobiles) at customer site 101. ECSS 102 can, for example, cause one or more electric vehicles at site 101 to discharge power to EDS 201 based on a load shape from the utility indicating that ECSS 102 should provide excess power to EDS 201, e.g., when power prices and demand on EDS 201 are high, power supply to EDS 201 is low, or a power outage has occurred.

According to various embodiments, energy control and storage system (ECSS) 102 can adjust the amount of power drawn from or provided to (i.e., exchanged with) EDS 201 based on a load shape that is optimized for EDS 201 from the standpoint of the utility. The load shape can be provided from central computer system 105 to ECSS 102. The load shape can indicate the amount of electric power that ECSS 102 should exchange with EDS 201 over any period of time. The load shape can, for example, instruct ECSS 102 to reduce power consumption from EDS 201 or to increase the energy stored in device 309 at various times. ECSS 102 can dynamically adjust the amount of power exchanged with EDS 201 to match the load shape exactly or as closely as possible. Alternatively or at various times, the load shape can indicate a maximum amount of electric power that ECSS 102 is allowed to draw from EDS 201. ECSS 102 can cause the amount of power it exchanges with EDS 201 to be less than any maximum power indicated by the load shape. ECSS 102 can perform these functions and the other functions disclosed herein using, for example, energy management software running on CU 310.

The load shape may change dynamically over time in response to varying conditions that affect the electric distribution system (EDS) 201. The varying conditions that affect EDS 201 include external variables and internal variables. Central computer system 105 can determine a load shape that is optimal for EDS 201 (or a portion thereof) over any period of time based on external variables that are, e.g., stored in storage devices 113 and/or databases 115, or received from an external source. Examples of the external variables include the current weather, a weather forecast, a forecast of utility customer power usage, a forecast of power generation to be supplied to EDS 201, the service needs of the EDS 201, the current power demand on EDS 201, the current power supply to EDS 201, the current price of electricity in the wholesale market, and a forecasted future price of electricity. Central computer system 105 then provides data that indicates the load shape to ECSS 102 through network 104. The data indicating the load shape is provided by network interface 301 to processor 302, memory 303, and/or user interfaces 304 in CU 310. The data can be stored in memory 303 and processed by processor 302. The data can be displayed to a user via user interfaces 304. ECSS 102 can attempt to match the power that it exchanges with EDS 201 to the load shape received from computer system 105 using the energy management software. Alternately, ECSS 102 can use the load shape (or a portion thereof) as a maximum amount of power to draw from or a minimum amount of power to provide to EDS 201.

The load shape can also be determined based on variables that are internal to the customer site (i.e., the internal variables) and that also affect EDS 201. Examples of the internal variables that affect EDS 201 include the power demands of the energy consuming devices at site 101, the amount of energy stored in energy storage device 309, the amount of power exchanged between EDS 201 and ECSS 102, and the amount of power being generated by on-site generation system 103. As described above, computing unit (CU) 310 can, for example, receive data indicating the internal variables from one or more of components 306-309 in ECSS 102. CU 310 can also receive a load shape that is generated based on the external variables from central computer system 105 via network interface 301. In some embodiments, CU 310 adjusts the load shape received from system 105 based on the internal variables to generate an adjusted load shape. ECSS 102 then controls the power exchanged with EDS 201 based on the adjusted load shape (e.g., to match power exchanged with EDS 201 to the adjusted load shape as closely as possible) using the energy management software.

As described above, CU 310 can, for example, transmit the data indicating the internal variables to central computer system 105 via network 104. The central computer system 105 can then determine a load shape that is optimal for the EDS 201 and the ECSS 102 over any period of time based on the external variables and based on the internal variables. Central computer system 105 then transmits data indicating the load shape to ECSS 102 via network 104. ECSS 102 then controls the power exchanged with EDS 201 based on the load shape received from central computer system 105. ECSS 102 can, for example, attempt to match the power that ECSS 102 exchanges with EDS 201 to the load shape received from computer system 105.

CU 310 can adjust the power that ECSS 102 exchanges with EDS 201 based on the load shape by controlling the amount of power that ECSS 102 provides to devices 203 from OSPGS 103 and energy storage device 309 using the energy management software. CU 310 controls which one or more of the sources of energy (i.e., EDS 201, OSPGS 103, or energy storage device 309) provides electric power to energy consuming devices 203 based at least in part on the load shape. Thus, CU 310 controls whether ECSS 102 provides electric power from EDS 201, from OSPGS 103, and/or from energy storage device 309 to energy consuming devices 203 based on the load shape.

CU 310 can also optimize the power stored in storage device 309 based on various factors, such as the power demand from energy consuming devices 203, power generation from OSPGS 103, and varying prices for drawing electricity from EDS 201 at different times of the day. One or more of these factors can be indicated by the load shape.

A utility can cause central computer system 105 to generate a load shape that indicates an amount of power that ECSS 102 can draw from EDS 201 when the power demands on EDS 201 are low and/or when electricity prices are low. As an example, if the electric power drawn by consuming devices 203 is equal to or less than the electric power indicated by the load shape, CU 310 can cause ECSS 102 to provide electric power only from EDS 201 to energy consuming devices 203.

As another example, the load shape can indicate an ideal time for energy storage device 309 to charge using power from EDS 201. If the load shape is greater than the expected or actual power demand from energy consuming devices 203 at certain hours of the day, ECSS 102 can cause storage device 309 to store charge from EDS 201 during these hours.

If the electric power drawn by consuming devices 203 is less than the electric power indicated by the load shape, and energy storage device 309 is not full, CU 310 can cause energy monitor 306 and power controller 308 to provide electric power from EDS 201 to energy consuming devices 203 and to energy storage device 309. In this example, some of the electric power received from EDS 201 is provided through energy monitor 306, bidirectional inverter 307, and power controller 308 to energy storage device 309. The power from EDS 201 is stored in device 309 for future use. ECSS 102 can use power from EDS 201 to charge energy storage device 309 at times when the price of electricity and electricity demand are low (e.g., during early morning hours of a day). ECSS 102 can then use the energy stored in device 309 to power devices 203 at a later time when electricity demand and prices are high to reduce the load on EDS 201.

A utility can cause central computer system 105 to generate a load shape that indicates an amount of power that ECSS 102 can draw from EDS 201 when the power demands on EDS 201 are high and/or electricity prices are high. The load shape can indicate a maximum or ideal amount of power that ECSS 102 can draw from EDS 201. As an example, if the electric power drawn by energy consuming devices 203 exceeds the electric power indicated by the load shape, CU 310 can cause ECSS 102 to provide electric power from on-site power generation system (OSPGS) 103 and/or energy storage device 309 to energy consuming devices 203. CU 310 causes the difference between the power draw from EDS 201 indicated by the load shape and the power demands of devices 203 to be drawn from OSPGS 103 and/or device 309. In this example, if the power being drawn by devices 203 is greater than the power that the utility wants ECSS 102 to draw from EDS 201 as indicated by the load shape, then CU 310 causes energy monitor 306 and power controller 308 to provide at least a portion of the power demands of devices 203 from OSPGS 103 and/or storage device 309. CU 310 controls whether the electric power provided to devices 203 comes from one or both of energy storage device 309 and/or OSPGS 103.

A utility can also cause central computer system 105 to generate a load shape that indicates an amount of power that ECSS 102 should provide to EDS 201 when the power demands on EDS 201 are high, power supply to EDS 201 is low, and/or electricity prices are high. If the load shape indicates that ECSS 102 should provide excess power to EDS 201, then ECSS 102 can provide any excess power from OSPGS 103 and/or energy storage device 309 to EDS 201. If, for example, energy storage device 309 is full or near full, CU 310 can cause power controller 308 and energy monitor 306 to provide energy stored in energy storage device 309 to EDS 201 to help satisfy the power needs of EDS 201 as indicated by the load shape. Energy can be stored in device 309 from EDS 201 when energy prices are low or from OSPGS 103 when OSPGS 103 is generating excess power. Then, the stored energy can be provided from device 309 to EDS 201 when energy prices are higher. Thus, ECSS 102 can optimize the power stored in storage device 309 from EDS 201 and from OSPGS 103 to reduce the cost of power consumption at customer site 101 and/or to eliminate negative electricity prices.

As another example, if OSPGS 103 is outputting more power than is needed by energy consuming devices 203, CU 310 can cause power controller 308, inverter 307, and energy monitor 306 to provide the excess power from OSPGS 103 to EDS 201 to help satisfy the energy needs of EDS 201 as indicated by the load shape. ECSS 102 may, for example, provide excess power generated by OSPGS 103 that is not consumed by devices 203 to EDS 201, even if storage device 309 is not full, if the load shape indicates that EDS 201 needs power from ECSS 102.

A utility can also cause central computer system 105 to generate a load shape indicating that ECSS 102 should draw little or no power from EDS 201, e.g., when power prices and demand on EDS 201 are high, power supply to EDS 201 is low, or a power outage has occurred. If the load shape indicates to draw little or no power from EDS 201, and OSPGS 103 and/or storage device 309 have enough energy output to satisfy the power demands of devices 203, then CU 310 can cause ECSS 102 to provide all of the power needs of devices 203 from one or both of OSPGS 103 and/or storage device 309. If OSPGS 103 is outputting enough power to satisfy the power demands of energy consuming devices 203, devices 203 may be powered entirely from the power output of OSPGS 103 via the power paths shown in FIG. 3 and described above. If OSPGS 103 is not outputting enough power to satisfy the power demands of energy consuming devices 203, and if energy storage device 309 has stored energy, then CU 310 can cause ECSS 102 to provide the stored energy from device 309 through the power paths shown in FIG. 3 and described above to devices 203.

If the energy stored in energy storage device 309 is below a threshold, and OSPGS 103 is generating sufficient power output, then CU 310 can cause power controller 308 to store some or all of the power output of OSPGS 103 in energy storage device 309. CU 310 can cause any excess power generated by OSPGS 103 to be stored in energy storage device 309 through power controller 308, for example, in response to data indicating that energy consuming devices 203 are using less power than is being generated by OSPGS 103, device 309 is not full, and the load shape indicates that the excess power is not needed by EDS 201.

If the power output of OSPGS 103 and/or energy storage device 309 does not meet the power demands of energy consuming devices 203, and the load shape indicates to draw less power from EDS 201 than is needed to make up the power deficit, ECSS 102 can receive electric power from other nearby locations via a local portion of EDS 201, as disclosed in detail below with respect to FIG. 4.

Figure 4:
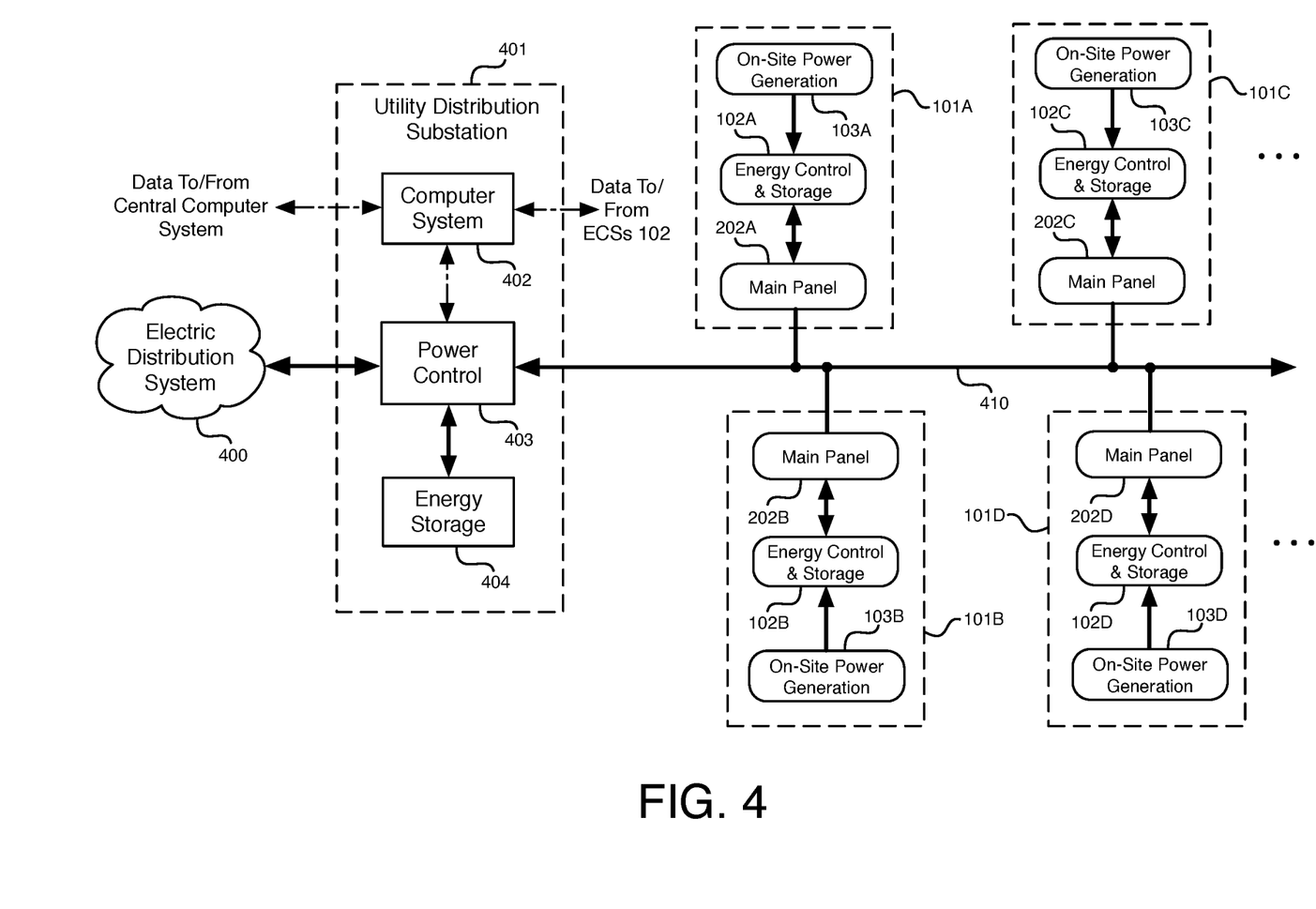
FIG. 4 illustrates an example of an electric distribution system that can provide electric power to utility customer sites from local power storage and generation, according to an embodiment.

FIG. 4 illustrates an example of an electric distribution system that can provide electric power to customer sites from local power storage and generation, according to an embodiment. FIG. 4 shows an electric distribution system (EDS) 400, a utility distribution substation (UDS) 401, electricity distribution lines 410, and 4 utility customer sites 101A, 101B, 101C, and 101D. EDS 400, UDS 401, and lines 410 may all be part of EDS 201. UDS 401 includes a computer system 402, a power control system (PCS) 403, and energy storage devices 404. Energy storage devices 404 can have significantly more energy storage capability than energy storage device 309.

In the system of FIG. 4, electric power is exchanged between EDS 400 and PCS 403 in UDS 401. Also, electric power is exchanged between PCS 403 and main panels 202A-202D at customers sites 101A-101D, respectively, through distribution lines 410. Four utility customer sites 101A-101D are shown in FIG. 4 as being connected to UDS 401 via lines 410 as an example. Although, it should be understood that UDS 401 may be connected to many more customer sites 101.

As shown in FIG. 4, computer system 402 can exchange data with central computer system 105. Central computer system 105 can provide data to computer system 402 that indicates, for example, the weather, the power demand on EDS 400, the power supply to EDS 400, the market price of electricity, and/or a desired load shape for a local portion of the electric distribution system connected to UDS 401. Computer system 402 can provide data to computer system 105 that indicates, for example, the energy stored in storage devices 404, and/or the current power demand and power supply of the customer sites 101 connected to UDS 401 via lines 410.

In the embodiment of FIG. 4, computer system 402 can also exchange data with energy control and storage systems (ECSSs) 102A-102D at customer sites 101A-101D, respectively. ECSSs 102A-102D can provide data to computer system 402 that indicates, for example, the amount of excess power being generated by on-site power generation systems 103A-103D, the amount of power stored in ECSSs 102A-102D, the power demands of the energy consuming devices 203 at the customer sites 101A-101D, and/or the loads on the EDS at the customer sites 101A-101D. Computer system 402 can provide data to ECSSs 102A-102D that indicates, for example, a demand response request or a load shape for each customer site 101. The load shapes provided to ECSSs 102A-102D can indicate, for example, how much power to draw from lines 410 or how much excess power to provide to lines 410 based on the load shape from system 105. The load shapes can be provided from computer system 402 to ECSSs 102A-102D, instead of, or in addition to, the load shape from computer system 105.

Computer system 402 controls the power provided between EDS 400, energy storage devices 404, and customer sites 101A-101D based on data (e.g., a load shape for the local EDS connected to UDS 401) received from central computer system 105 and/or data received from one or more of ECSSs 102A-102D. Computer system 402 can, for example, generate an adjusted load shape for each of the ECSSs 102A-102D that is based on the load shape for the local EDS received from computer system 105, the energy stored in one or more of storage devices 404, and/or the data received from one or more of ECSSs 102A-102D. Computer system 402 can then provide the adjusted load shapes to ECSSs 102A-102D, via wired and/or wireless networks. Computer 402 can, for example, attempt to match the total load from sites 101A-101D to the load shape for the local EDS received from system 105 by providing the adjusted load shapes to the ECSSs 102A-102D. ECSSs 102A-102D then attempt to match their loads on the EDS via lines 410 to the adjusted load shapes received from computer system 402.

The power system of FIG. 4 can also be used as an aggregated electricity market asset to provide locational energy services, such as demand response, support for smart grid management software applications, and outage mitigation. As an example, computer system 402 can send demand response requests to one or more of ECSSs 102A-102D to reduce power consumption in response to a load shape from system 105 indicating that power demand on EDS 400 is high, power supply to EDS 400 is low, and/or an outage has occurred in EDS 400.

Storage devices 404 provide additional flexibility to EDS 400. For example, computer system 402 can direct PCS 403 to store power received from EDS 400 in energy storage devices 404 when the power demand on EDS 400 is low and electricity prices are low. Computer system 402 can also direct PCS 403 to store power received from customer sites 101A-101D in energy storage devices 404 when, for example, on-site power generation systems 103A-103D are generating excess power. The power stored in energy storage devices 404 can be provided to customer sites 101A-101D or to EDS 400 at a later time in response to a load shape from system 105 indicating, for example, when the price for electricity from EDS 400 is high or an outage has occurred in EDS 400. The energy stored in devices 404 can be sold to a broader electricity market connected to EDS 400 as an aggregated asset when electricity prices are higher. The funds generated from these sales can, for example, be used to reduce the flat utility bills charged to the utility customers. Storing energy in devices 404 may eliminate negative electricity prices.

Power may, for example, be provided from storage devices 404 to sites 101A-101D if the power generated and stored at sites 101A-101D does not meet their power demands, and the load shape from system 105 indicates to draw less power from EDS 400 than is needed to meet the power deficit at sites 101A-101D. The load shape may direct UDS 401 to draw less power from EDS 400 due to high power demand or an outage in EDS 400. ECSSs 102A-102D can send requests to computer system 402 for more power when the power generated and stored at their respective customer sites 101A-101D is not sufficient to meet their power demands. Computer system 402 can direct PCS 403 to provide power from energy storage devices 404 to one or more of customer sites 101A-101D via lines 410 in response to requests from the respective ECSSs 102A-102D and the load shape from system 105. As another example, if one customer site 101 does not have enough power generation or storage, and another customer site 101 has surplus power generation or storage, power can be provided from the customer site having the surplus to the customer site having the deficit through lines 410.

At times when the power demand on EDS 400 is high, and customer sites 101A-101D have enough stored power or power generation to satisfy their power needs, computer system 402 can direct PCS 403 to provide power from energy storage devices 404 to EDS 400. Computer system 402 monitors the power stored and generated at sites 101A-101D using data received from ECSSs 102A-102D, respectively. Computer system 402 can cause PCS 403 to provide power that is stored in storage devices 404 to EDS 400, for example, in response to a load shape received from central computer system 105 indicating that EDS 400 needs more power generation. As discussed above, power may be stored in devices 404 from EDS 400 and/or from on-site power generation systems 103A-103D when electricity demand and prices are low. Thus, excess power generated by on-site power generation systems 103A-103D and/or stored in ECSSs 102A-102D at customer sites connected to UDS 401 in a local area can be stored in devices 404, and then later sold to a broader electricity market that is connected to EDS 400 as an aggregated electricity market asset when electricity demand and prices are higher. In this way, on-site power generation systems 103A-103D can be aggregated to function as a virtual power plant that reduces power fluctuations on EDS 400 and/or on lines 410.

Figure 5:
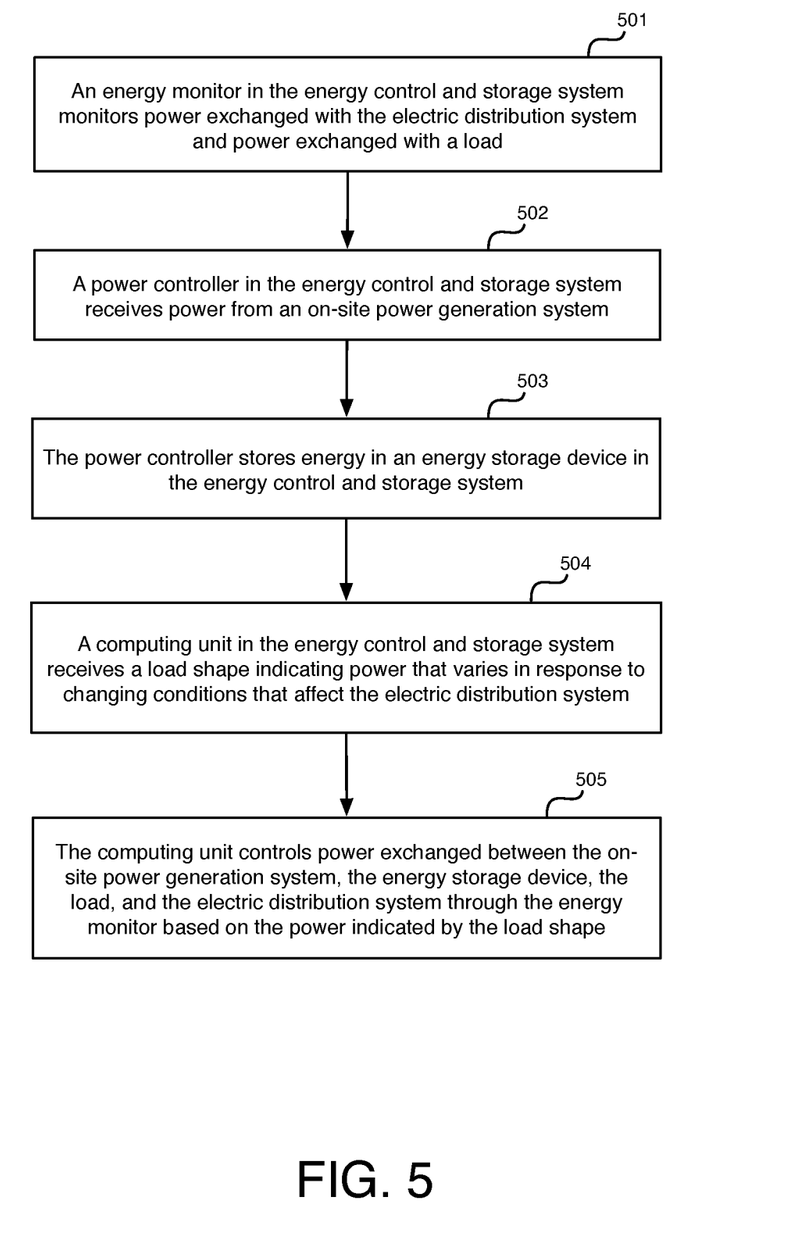
FIG. 5 is a flow chart illustrating examples of operations that can be performed by an energy control and storage system for controlling power exchanged with an electric distribution system, according to an embodiment.

FIG. 5 is a flow chart illustrating examples of operations that can be performed by an energy control and storage system for controlling power exchanged with an electric distribution system, according to an embodiment. In operation 501, an energy monitor in the energy control and storage system monitors power exchanged with the electric distribution system and power exchanged with a load. ECSS 102 and EDS 201/400, are examples of the energy control and storage system and the electric distribution system, respectively, of FIG. 5. Energy monitor 306 and power controller 308 are examples of the energy monitor. In operation 502, a power controller in the energy control and storage system receives power from an on-site power generation system. In operation 503, the power controller stores energy in an energy storage device in the energy control and storage system. OSPGS 103, power controller 308, and energy storage device 309 are examples of the on-site power generation system, the power controller, and the energy storage device of FIG. 5. In operation 504, a computing unit in the energy control and storage system receives a load shape indicating power that varies in response to changing conditions that affect the electric distribution system. In operation 505, the computing unit controls power exchanged between the on-site power generation system, the energy storage device, the load, and the electric distribution system through the energy monitor based on the power indicated by the load shape. Computing unit 310 is an example of the computing unit of FIG. 5.

The following examples pertain to further embodiments. Example 1 is an energy control and storage system comprising an energy monitor coupled to monitor power provided between an electric distribution system and a load; a power controller coupled to exchange power with the energy monitor and coupled to receive power from a power generation system; an energy storage device coupled to store energy received through the power controller; and a computing unit coupled to control the power controller and the energy monitor, wherein the computing unit receives a load shape from outside the energy control and storage system, and wherein the computing unit controls power exchanged between the energy control and storage system and the electric distribution system based on power indicated by the load shape that changes in response to varying conditions affecting the electric distribution system.

In Example 2, the energy control and storage system of Example 1 can optionally include wherein the computing unit causes the energy monitor and the power controller to attempt to match the power exchanged with the electric distribution system to the power indicated by the load shape.

In Example 3, the energy control and storage system of any one of Examples 1-2 can optionally include wherein the computing unit causes the energy monitor and the power controller to provide power from the electric distribution system to the load and to the energy storage device based on power drawn by the load being less than the power indicated by the load shape.

In Example 4, the energy control and storage system of any one of Examples 1-3 can optionally include wherein the computing unit causes the energy monitor or the power controller to provide power from at least one of the energy storage device or the power generation system to the load if power drawn by the load exceeds the power indicated by the load shape.

In Example 5, the energy control and storage system of any one of Examples 1-4 can optionally include wherein the computing unit causes the energy monitor to provide power from the power generation system or the energy storage device to the electric distribution system based on the power that the load shape indicates to provide from the energy control and storage system to the electric distribution system.

In Example 6, the energy control and storage system of any one of Examples 1-5 can optionally include wherein the varying conditions affecting the electric distribution system comprise one or more of power demands of the load, energy stored in the energy storage device, or power generated by the power generation system.

In Example 7, the energy control and storage system of any one of Examples 1-6 can optionally include wherein the varying conditions affecting the electric distribution system comprise one or more of current weather, a weather forecast, a forecast of power usage at utility customer sites, a forecast of power generation to be supplied to the electric distribution system, service needs of the electric distribution system, power demand on the electric distribution system, power supply to the electric distribution system, or a price of electricity provided from the electric distribution system.

In Example 8, the energy control and storage system of any one of Examples 1-7 can optionally further include an inverter coupled between the energy monitor and the power controller that converts power exchanged between the energy monitor and the power controller between alternating current and direct current.

In Example 9, the energy control and storage system of any one of Examples 1-8 can optionally include wherein the inverter, the computing unit, the energy storage device, the power controller, and the energy monitor are housed in a single unit.

Example 10 is a method for controlling power exchanged with an electric distribution system using an energy control and storage system, the method comprising: monitoring power exchanged with the electric distribution system and power exchanged with a load using at least one energy monitor in the energy control and storage system; receiving power from an on-site power generation system at a power controller in the energy control and storage system; storing energy in an energy storage device in the energy control and storage system using the power controller; receiving at a computing unit a load shape indicating power that varies in response to changing conditions that affect the electric distribution system; and controlling power exchanged between the on-site power generation system, the energy storage device, the load, and the electric distribution system through the energy monitor based on the power indicated by the load shape using the computing unit.

In Example 11, the method of Example 10 can optionally include wherein controlling power exchanged between the on-site power generation system, the energy storage device, the load, and the electric distribution system through the energy monitor further comprises attempting to match the power exchanged between the energy control and storage system and the electric distribution system to the power indicated by the load shape using the computing unit.

In Example 12, the method of any one of Examples 10-11 can optionally include wherein controlling power exchanged between the on-site power generation system, the energy storage device, the load, and the electric distribution system through the energy monitor further comprises providing power from the electric distribution system to the load and to the energy storage device in response to power drawn by the load being less than the power indicated by the load shape.

In Example 13, the method of any one of Examples 10-12 can optionally include wherein controlling power exchanged between the on-site power generation system, the energy storage device, the load, and the electric distribution system through the energy monitor further comprises providing power from at least one of the energy storage device or the on-site power generation system to the load if power drawn by the load exceeds the power indicated by the load shape.

In Example 14, the method of any one of Examples 10-13 can optionally include wherein controlling power exchanged between the on-site power generation system, the energy storage device, the load, and the electric distribution system through the energy monitor further comprises providing power from at least one of the on-site power generation system or the energy storage device to the electric distribution system through the energy monitor in response to the power indicated by the load shape.

In Example 15, the method of any one of Examples 10-14 can optionally include wherein controlling power exchanged between the on-site power generation system, the energy storage device, the load, and the electric distribution system through the energy monitor further comprises controlling power exchanged with the electric distribution system based on the load shape that dynamically changes over time based on power stored in a distribution substation connected to the electric distribution system.

Example 16 is a central computer system comprising: a storage device; and a processor device, wherein the processor device is configured to: receive data from the storage device indicating varying conditions affecting an electric distribution system that exchanges power with energy control and storage systems at utility customer sites, generate load shapes that indicate power to exchange between the electric distribution system and the energy control and storage systems based on the varying conditions, and provide one of the load shapes to each of the energy control and storage systems at the utility customer sites to control power that the energy control and storage systems exchange with the electric distribution system.

In Example 17, the central computer system of Example 16 can optionally include wherein the varying conditions affecting the electric distribution system comprise one or more of current weather, a weather forecast, a forecast of power usage at the utility customer sites, a forecast of power generation to be supplied to the electric distribution system, service needs of the electric distribution system, power demand on the electric distribution system, power supply to the electric distribution system, a price of electricity provided from the electric distribution system, or energy stored in storage devices at a utility distribution substation.

In Example 18, the central computer system of any one of Examples 16-17 can optionally include wherein the varying conditions affecting the electric distribution system comprise at least one of power demands of energy consuming devices at the utility customer sites, energy stored in energy storage devices at the utility customer sites, or power generated by on-site power generation systems at the utility customer sites.

In Example 19, the central computer system of any one of Examples 16-18 can optionally include wherein the processor device is further configured to generate periodic flat bills for the utility customer sites that comprise a cost of electricity drawn from the electric distribution system by the utility customer sites and an amortization of cost of the energy control and storage system at the utility customer sites.

In Example 20, the central computer system of any one of Examples 16-19 can optionally include wherein the processor device is further configured to generate an additional load shape indicating power to be exchanged between a local portion of the electric distribution system that is connected to a utility distribution substation and a remainder of the electric distribution system, and wherein the processor device is further configured to provide the additional load shape to the utility distribution substation.

Example 21 is a computer system at a utility distribution substation connected to a local portion of an electric distribution system, wherein the computer system is configured to: cause a power control system to store energy received from on-site power generation systems at utility customer sites through the local portion of the electric distribution system in at least one energy storage device at the utility distribution substation during a period of time when a price of electricity from the electricity distribution system is below a threshold; and provide the energy stored in the energy storage device through the power control system to the electric distribution system as an aggregated asset sold to a power market during a period of time when the price of electricity from the electricity distribution system is above the threshold.

In Example 22, the computer system of Example 21 can optionally include wherein the computer system is further configured to: receive a load shape for the local portion of the electric distribution system that changes in response to varying conditions affecting the electric distribution system; generate adjusted load shapes based on the load shape and based on energy stored in the energy storage device at the utility distribution substation; and provide the adjusted load shapes to energy control and storage systems at the utility customer sites to control power that the energy control and storage systems exchange with the electric distribution system through the utility distribution substation.

Example 23 is a computer system at a utility distribution substation, wherein the computer system is configured to: receive a load shape that changes in response to varying conditions affecting an electric distribution system that exchanges power with energy control and storage systems at utility customer sites; generate adjusted load shapes based on the load shape and based on energy stored in energy storage devices at the utility distribution substation; and provide one of the adjusted load shapes to each of the energy control and storage systems to control power that the energy control and storage systems exchange with the electric distribution system through the utility distribution sub station.

Example 24 is a non-transitory computer readable storage medium including instructions that, when executed by a processor, cause the processor to implement any one of Examples 1-23.

Example 25 is a computer system configured to implement any one of Examples 10-15.

Example 26 is a method to implement any one of Examples 1-9 and 16-23.

Some embodiments of the present invention can be implemented using hardware, software, a non-transitory computer-readable medium containing program instructions, or a combination thereof. Software implemented by embodiments of the present invention or results of the present invention can be stored in some form of a non-transitory computer-readable medium such as semiconductor memory devices, hard disc drive, CD-ROM, DVD, or other non-transitory media for subsequent purposes such as being executed or processed by a processor, being displayed to a user, etc. Also, software implemented according to embodiments of the present invention or results of the present invention may be transmitted in a signal over a network. Results of the present invention can be used for various purposes such as being executed or processed by a processor, being displayed to a user, transmitted in a signal over a network, etc. It is intended that the scope of the present invention not be limited by this detailed description, but rather by the claims appended hereto.

Although the method operations were described in a specific order, it should be understood that other operations may be performed in between described operations, described operations may be adjusted so that they occur at different times or in a different order, or described operations may be distributed in a system that allows the occurrence of the operations at various intervals associated with the processing.

The foregoing description of the exemplary embodiments of the present invention has been presented for the purpose of illustration. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. An energy control and storage system comprising:
an energy monitor coupled to monitor power provided between an electric distribution system and a load;
a power controller coupled to exchange power with the energy monitor and coupled to receive power from a power generation system, wherein the power generation system is at a site containing the energy control and storage system;

an energy storage device coupled to store energy received through the power controller; and a computing unit coupled to control the power controller and the energy monitor, wherein the computing unit is configured to receive a load shape from outside the energy control and storage system that changes in response to variables that are external to the site and that affect the electric distribution system, wherein the computing unit adjusts the load shape to generate an adjusted load shape based on variables internal to the site and that comprise at least one of power demands of the load, energy stored in the energy storage device, power exchanged between the electric distribution system and the energy control and storage system, or power generated by the power generation system, and wherein the computing unit causes the energy monitor and the power controller to attempt to match power exchanged between the energy control and storage system and the electric distribution system to power indicated by the adjusted load shape.

2. The energy control and storage system of claim 1, wherein the computing unit determines whether to provide electric power from the energy storage device or from the power generation system through the energy monitor to the electric distribution system based on the load shape.

3. The energy control and storage system of claim 1, wherein the computing unit causes the energy monitor and the power controller to provide power from the electric distribution system to the load and to the energy storage device based on power drawn by the load being less than power indicated by the load shape.

4. The energy control and storage system of claim 1, wherein the computing unit causes the energy monitor or the power controller to provide power from at least one of the energy storage device or the power generation system to the load if power drawn by the load exceeds power indicated by the load shape.

5. The energy control and storage system of claim 1, wherein the computing unit causes the energy monitor to provide power from the power generation system or the energy storage device to the electric distribution system based on power that the load shape indicates to provide from the energy control and storage system to the electric distribution system.

6. The energy control and storage system of claim 1, wherein the variables that are external to the site comprise current power supply to the electric distribution system and current power demand on the electric distribution system.

7. The energy control and storage system of claim 1, wherein the variables that are external to the site comprise at least one of current weather, a weather forecast, a forecast of power usage at utility customer sites, a forecast of power generation to be supplied to the electric distribution system, service needs of the electric distribution system, power demand on the electric distribution system, power supply to the electric distribution system, or a price of electricity provided from the electric distribution system.

8. The energy control and storage system of claim 1 further comprising:
an inverter coupled between the energy monitor and the power controller that converts power exchanged between the energy monitor and the power controller between alternating current and direct current.

9. The energy control and storage system of claim 8, wherein the inverter, the computing unit, the energy storage device, the power controller, and the energy monitor are components housed in a single unit.

10. A method for controlling power exchanged with an electric distribution system using an energy control and storage system, the method comprising:
monitoring power exchanged with the electric distribution system and power exchanged with a load using at least one energy monitor in the energy control and storage system;
receiving power from a power generation system at a power controller in the energy control and storage system, wherein the power generation system is at a site containing the energy control and storage system;
storing energy in an energy storage device in the energy control and storage system using the power controller;
receiving at a computing unit a load shape indicating a maximum power to draw from the electric distribution system that varies in response to changing conditions that affect the electric distribution system and that are external to the site, wherein the computing unit is in the energy control and storage system, and wherein the computing unit receives the load shape from outside the energy control and storage system;
adjusting the load shape using the computing unit to generate an adjusted load shape based on variables internal to the site and that comprise at least one of power demands of the load, energy stored in the energy storage device, power exchanged between the electric distribution system and the energy control and storage system, or power generated by the power generation system; and
causing the energy control and storage system to attempt to match power exchanged with the electric distribution system through the energy monitor to power indicated by the adjusted load shape using the computing unit.

11. The method of claim 10, wherein the changing conditions that affect the electric distribution system and that are external to the site comprise a forecast of power generation to be supplied to the electric distribution system and a forecast of power usage drawn from the electric distribution system.

12. The method of claim 10, further comprising:
providing power from the electric distribution system to the load and to the energy storage device in response to power drawn by the load being less than power indicated by the load shape.

13. The method of claim 10, further comprising:
providing power from at least one of the energy storage device or the power generation system to the load if power drawn by the load exceeds power indicated by the load shape.

14. The method of claim 10, further comprising:
providing power from at least one of the power generation system or the energy storage device to the electric distribution system through the energy monitor based on power indicated by the load shape.

15. The method of claim 10, further comprising:
controlling the power exchanged with the electric distribution system based on the load shape that dynamically changes over time based on power stored in an additional energy storage device in a utility distribution substation connected to the electric distribution system.

16. A central computer system comprising:
a first storage device; and
a processor device, wherein the processor device is configured to:
receive data from the first storage device indicating varying conditions affecting an electric distribution system that exchanges power with energy control and storage systems at utility customer sites, generate load shapes that indicate power to exchange between the electric distribution system and the energy control and storage systems based on the varying conditions, and provide one of the load shapes to each of the energy control and storage systems at the utility customer sites to control power that the energy control and storage systems exchange with the electric distribution system, wherein each of the energy control and storage systems comprises:

an energy monitor coupled to monitor power provided between the electric distribution system and a load;

a power controller coupled to exchange power with the energy monitor and coupled to receive power from a power generation system;

a second storage device coupled to store energy received through the power controller; and a computing unit coupled to control the power controller and the energy monitor, wherein the computing unit receives one of the load shapes from the central computer system, wherein the computing unit adjusts the load shape received from the central computer system to generate an adjusted load shape based on variables internal to the respective utility customer site and that comprise at least one of power demands of the load, energy stored in the second storage device, power exchanged between the electric distribution system and the energy control and storage system, or power generated by the power generation system, and wherein the computing unit causes the energy monitor and the power controller to attempt to match power exchanged between the energy control and storage system and the electric distribution system to power indicated by the adjusted load shape.

17. The central computer system of claim 16, wherein the varying conditions affecting the electric distribution system comprise at least one of current weather, a weather forecast, a forecast of power usage at the utility customer sites, a forecast of power generation to be supplied to the electric distribution system, service needs of the electric distribution system, power demand on the electric distribution system, power supply to the electric distribution system, a price of electricity provided from the electric distribution system, or energy stored in storage devices at a utility distribution substation.

18. The central computer system of claim 16, wherein the varying conditions affecting the electric distribution system comprise at least one of power demands of energy consuming devices at the utility customer sites, energy stored in energy storage devices at the utility customer sites, or power generated by on-site power generation systems at the utility customer sites.

19. The central computer system of claim 16, wherein the processor device is further configured to generate periodic flat bills for the utility customer sites that reflect a cost of electricity drawn from the electric distribution system by the utility customer sites and an amortization of cost of the energy control and storage systems at the utility customer sites.

20. The central computer system of claim 16, wherein the processor device is further configured to generate an additional load shape indicating power to be exchanged between a local portion of the electric distribution system that is connected to a utility distribution substation and a remainder of the electric distribution system, and wherein the processor device is further configured to provide the additional load shape to the utility distribution substation.

21. An energy control and storage system designed to be placed at a utility customer site, wherein the energy control and storage system comprises:

an energy monitor coupled to monitor power provided between an electric distribution system and a load;

a power controller coupled to exchange power with the energy monitor and coupled to receive power from a power generation system;

an energy storage device coupled to store energy received through the power controller; and a computing unit coupled to control the power controller and the energy monitor, wherein the computing unit receives a load shape from outside the energy control and storage system that changes in response to variables that are external to the utility customer site and that affect the electric distribution system, wherein the computing unit adjusts the load shape to generate an adjusted load shape based on variables internal to the utility customer site and that comprise at least one of power demands of the load, energy stored in the energy storage device, power exchanged between the electric distribution system and the energy control and storage system, or power generated by the power generation system, and wherein the computing unit causes the energy monitor and the power controller to attempt to match power exchanged between the energy control and storage system and the electric distribution system to power indicated by the adjusted load shape.

22. The energy control and storage system of claim 21, wherein the variables that are external to the utility customer site comprise current power supply to the electric distribution system and current power demand on the electric distribution system.

* * * * *